United States Patent [19]

Sarides

[11] 4,208,649
[45] Jun. 17, 1980

[54] APPARATUS FOR DETECTING PRESSURE IN PNEUMATIC TIRES

[76] Inventor: Athanase K. Sarides, 88 Baroness Crescent, Willowdale, Ontario M1P, Canada

[21] Appl. No.: 35

[22] Filed: Jan. 2, 1979

[30] Foreign Application Priority Data

Oct. 17, 1978 [GB] United Kingdom ............ 40916/78
Nov. 8, 1978 [GB] United Kingdom ............ 43698/78

[51] Int. Cl.² .................................................. B60C 23/04
[52] U.S. Cl. ................................... 340/58; 73/146.5; 200/61.25
[58] Field of Search ................. 340/58; 200/61.25; 73/146.5

[56] References Cited

U.S. PATENT DOCUMENTS

| | | | |
|---|---|---|---|
| 3,638,180 | 1/1972 | Lejeune | 340/58 |
| 3,760,351 | 9/1973 | Thomas | 340/58 |
| 3,781,787 | 12/1973 | Suggimama | 340/58 |
| 3,828,309 | 8/1974 | Yamasaki et al. | 340/58 |
| 3,832,681 | 8/1974 | Kaida et al. | 340/58 |
| 4,134,102 | 1/1979 | Stewart et al. | 200/61.25 X |
| 4,157,530 | 6/1979 | Merz | 340/58 |

Primary Examiner—John W. Caldwell, Sr.
Assistant Examiner—Joseph E. Nowicki
Attorney, Agent, or Firm—Robert F. Delbridge; Arne I. Fors

[57] ABSTRACT

Apparatus for detecting loss of pressure in a pneumatic tire, while it is in use on a vehicle, includes an actuator secured to the wheel so as to rotate therewith. The actuator is in communication with the air in the tire and has a movable part of magnetically active material positioned in accordance with the magnitude of the air pressure. A magnetically actuated device is mounted on the vehicle so as to be variably actuated according to the position of the magnetically active part of the actuator as it rotates with the wheel, and an indicator connected to the magnetically actuated device indicates loss of air pressure in the tire.

5 Claims, 4 Drawing Figures

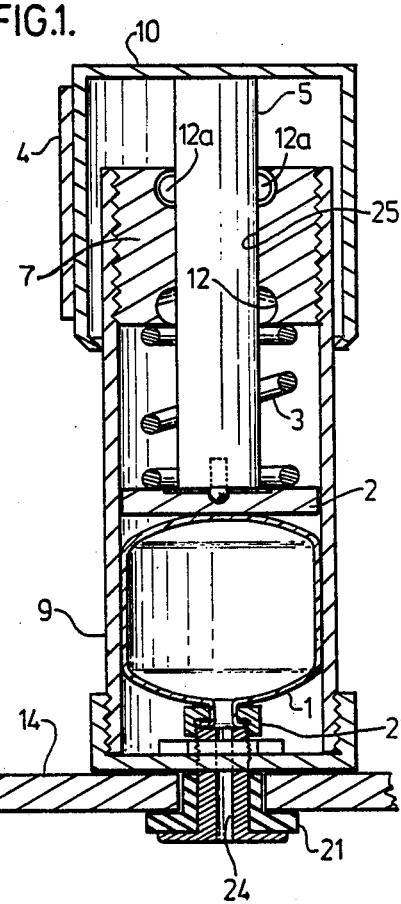
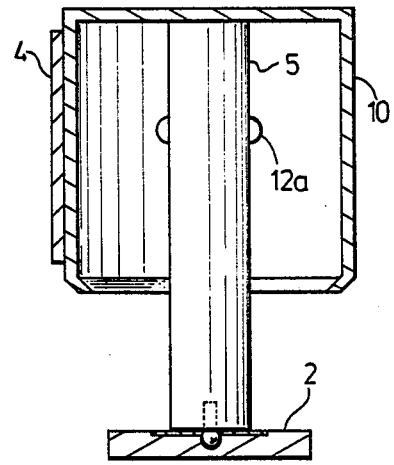
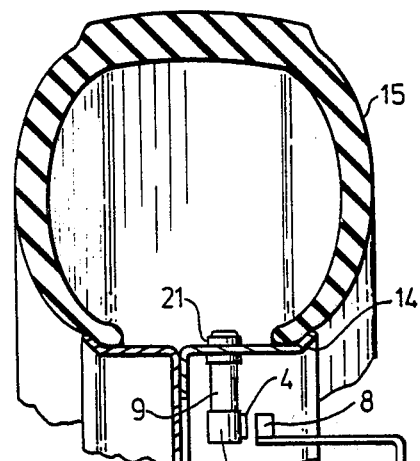
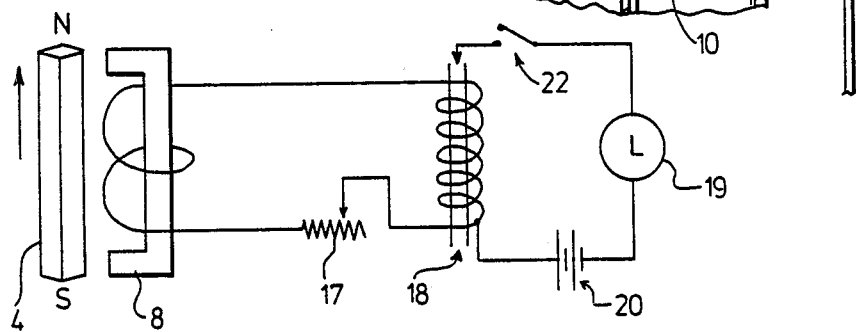

APPARATUS FOR DETECTING PRESSURE IN PNEUMATIC TIRES

This invention relates to apparatus for detecting loss of pressure in pneumatic tires while they are in use on a vehicle.

Various proposals have been made in the past for apparatus of this nature, but for one reason or another such known proposals have not been commercially successful. It is therefore an object of the invention to provide improved apparatus of this kind.

According to the present invention, apparatus for detecting loss of pressure in a pneumatic tire, while it is in use on a vehicle, comprises an actuator secured to the wheel so as to rotate therewith, the actuator being in communication with the air in the tire and having a movable part of magnetically active material positioned in accordance with the magnitude of the air pressure, magnetically actuated means mounted on the vehicle so as to be variably actuated according to the position of the magnetically active part of the actuator as it rotates with the wheel, and indicator means connected to the magnetically actuated means to indicate loss of air pressure in the tire.

The actuator may include a slidably mounted piston movable by the air pressure in the tire so as to position the magnetically active part accordingly. Advantageously, such movement of the piston causes the magnetically active part to move angularly around the axis along which the piston moves.

The magnetically actuated means may include an electrical coil, and the indicator means may include an audible and/or visual warning device. The magnetically sensitive means may be connected to the indicator means in such a manner that the indicator means is only actuated when a predetermined loss of air pressure in the tire has occurred.

One embodiment of the invention will now be described, by way of example, with reference to the accompanying drawings, of which:

FIG. 1 is a cross-sectional view of an actuator,

FIG. 2 is a part-sectional view of a portion of the actuator of FIG. 1,

FIG. 3 is a sectional view of a wheel with the actuator mounted on its rim and of the magnetically actuated means adjacent thereto, and FIG. 4 is an electrical circuit diagram showing the magnetically actuated means and the indicator means.

Referring to the drawings, an actuator includes a flexible bag 1 of resiliently extensible material, such as rubber, mounted in a cylindrical housing 9. The rubber bag 1 engages a piston 2 slidable in the housing 9, and has an open end secured to one end of the housing 9 by a threaded clamp 23, so that the open end of the bag 1 communicates with a passage 24 in the end of the housing 9.

The piston 2 is carried by a shaft 5 which extends through a bore 25 in an adjustable nut 7 threaded into the opposite end of the cylinder 9. The bore 25 of the nut 7 has a helical groove 12 into which lugs 12a on the shaft 5 extend. A spring 3 acts between the nut 7 and the piston 2 to urge the piston 2 towards the rubber bag 1. The exterior end of the shaft 5 carries a cap 10 to which a flexible magnetic strip 4 is secured.

In use, the actuator is mounted on a wheel, as shown in FIG. 3, with the housing 9 being secured to the wheel rim 14 by a connector 21. The connector 21 connects the housing 9 to the wheel rim 14 in a similar manner to the well known connection of an inflation valve to a wheel rim, as will be clearly apparent to a person skilled in the art. The open end of the rubber bag 1 is in communication with the interior of the tire 15 through a passage 24 in the connector 21.

An electrical coil 8 is mounted on the vehicle adjacent the path traversed by the actuator as it rotates with the wheel. As shown in FIG. 4, the coil is connected through a rheostat 17 and relay 18 to indicator means 19, which may comprise a flashing red light and/or a buzzer.

When the wheel rotates with the tire at the correct pressure, the magnetic strip 4 is positioned at a 180° angle away from the coil 8, so that the magnetic strip 4 will not induce any appreciable voltage in the coil 8 when it passes the coil 8 during each rotation of the wheel. If a small voltage is induced, it can be rendered ineffective by adjustment of the rheostat 17, so that the relay 18 is not actuated. The rheostat 17 is located adjacent the indicating means 19 on the dashboard of the vehicle.

If the air pressure in the tire decreases, the air pressure in the rubber bag 1 decreases correspondingly with the result that the piston 2 is moved by the spring 3. This movement causes the piston 2 to move angularly because of the engagement of the lugs 12a on the shaft 5 in the helical groove 12 in the nut 7, with such angular movement causing rotation of the cap 10 and magnetic strip 4 about the longitudinal axis of movement of the piston 2 to a position nearer the coil 8. As the magnetic strip 4 starts such rotation, it induces an increasing voltage in the coil 8 each time it passes the coil 8 as the wheel rotates. When the magnetic strip 4 becomes sufficiently close to the coil 8 during rotation of the wheel, that is to say when a predetermined loss of air pressure in the tire 15 has occurred, the increased voltage induced in the coil 8 closes the relay 18 so that the indicating means 19 is actuated to flash a red light and/or sound a buzzer. The electrical supply is the car battery 20, and the relay 18 is maintained in the closed position by current from the battery 20.

The relay circuit also includes a switch 22 coupled to the vehicle ignition switch (not shown) so that when the engine is switched off, the switch 22 is opened to deactivate the relay 18.

When the correct pressure in the tire 15 is restored, the piston 2 is moved linearly and angularly back to its original position, so that the magnetic strip 4 is once again at the 180° angle away from the coil 8. Preferably, the arrangement is such that the relay 18 is actuated when air pressure loss in the tire 15 has caused the magnetic strip 4 to rotate about 180° to a position nearest the coil 8.

The helical groove 12 in the nut 7 and the lugs 12a on the shaft 5 may be omitted if desired, so that the magnetic strip 4 moves linearly instead of angularly, when the tire pressure changes. Also, the rubber bag 1 may be omitted if a suitable seal is mounted on the piston 2 to avoid loss of air from the tire between the piston 2 and the wall of the housing 9.

In a four-wheel vehicle, each wheel may be equipped with its own actuator and magnetically actuated means. The magnetically actuated means may all be connected to one warning indicator or to four separate indicators, which in the latter case shows the driver which wheel has lost air pressure.

Other embodiments of the invention will be apparent to a person skilled in the art, the scope of the invention being defined in the appended claims.

What I claim as new and desire to protect by Letters Patent of the United States is:

1. Apparatus for detecting loss of pressure in a pneumatic tire, while it is in use on a vehicle, comprising an actuator secured to the wheel so as to rotate therewith, the actuator including a slidably mounted piston movable linearly by the air pressure in the tire in accordance with the magnitude of the air pressure, a part of magnetically active material carried by the piston, and means causing the piston to move angularly about its direction of linear movement as the piston moves linearly to angularly orientate the part of magnetically active material in accordance with the magnitude of the air pressure in the tire, magnetically actuated means mounted on the vehicle so as to be variably actuated according to the angular orientation of the magnetically active part of the actuator as it rotates with the wheel, and indicator means connected to the magnetically actuated means to indicate loss of air pressure in the tire.

2. Apparatus according to claim 1 wherein the magnetically actuated means comprises an electrical coil in which an electrical voltage is induced by the magnetically active part of the actuator to cause operation of the indicator means.

3. Apparatus according to claim 1 wherein the magnetically actuated means includes means preventing the operation of the indicator means until a predetermined loss of tire pressure has occurred.

4. Apparatus according to claim 2 wherein the magnetically actuated means also includes a relay connected to the indicating means and actuated by the voltage induced in the electrical coil when a predetermined loss in tire pressure has occurred.

5. Apparatus according to claim 1 wherein the actuator also includes a flexible bag in communication with the air in the tire and engaging the piston to position said piston in accordance with the magnitude of the air pressure.

* * * * *